Nov. 25, 1969    D. F. HOWARD    3,479,717
LEAD MAKING MACHINE
Filed March 27, 1967    9 Sheets-Sheet 2

Fig. 2

Nov. 25, 1969    D. F. HOWARD    3,479,717
LEAD MAKING MACHINE

Filed March 27, 1967    9 Sheets-Sheet 4

FIG. 4

Nov. 25, 1969  D. F. HOWARD  3,479,717
LEAD MAKING MACHINE
Filed March 27, 1967  9 Sheets-Sheet 6

FIG. 8

FIG. 7A 3,479,717
LEAD MAKING MACHINE
David Francis Howard, Camp Hill, Pa., assignor to AMP Incorporated, Camp Hill, Pa.
Filed Mar. 27, 1967, Ser. No. 626,322
Int. Cl. H01r 43/00
U.S. Cl. 29—203          6 Claims

ABSTRACT OF THE DISCLOSURE

Lead making machine comprises conveyor having aligned pairs of associated wire clamps thereon at spaced intervals. Wire or other filamentary material is loaded on a pair of clamps at a loading station by a wire feeding means adapted to feed wire normally of the path of movement of the conveyor. Feeding means has extensible guide tube which is initially extended until its end is disposed adjacent to clamp on opposite side of the conveyer from the feeding means. End of wire is positioned in clamp on opposite side which is then closed and feeding means is retracted. During retraction, wire is fed through the guide tube and the length of wire fed hangs as a loop beneath the conveyer. Second clamp is then closed and wire is cut at a location adjacent to the second clamp. Ends of lead are then presented to various operating mechanisms such as wire strippers or terminal applying mechanisms as conveyor moves along its path.

BACKGROUND OF THE INVENTION

A variety of types of fully automatic lead making machines are presently available. These automatic lead making machines feed wire from a coil or other endless source, cut individual leads from the wire, strip insulation from the lead ends, and apply terminals to the stripped ends.

The machines presently available are capable of producing finished leads of different lengths, however, the wire feeding mechanisms must be adjusted or set when the lead length is changed and this usually involves stopping the machine. Presently available machines are thus practical and efficient if large numbers of leads of a given length are being produced but they are not practical where leads of varying lengths must be manufactured.

The present invention is directed to the problem of providing a fully automatic lead making machine capable of turning out a succession of leads of any desired length and of different lengths. The invention is further directed to the problem of achieving a high degree of flexibility as regarded lead lengths without sacrifice of speed of production.

SUMMARY OF THE INVENTION

In accordance with a preferred embodiment of the invention, there is provided a single conveyer chain which is intermittently moved along a predetermined path beside which there is provided a loading station and a plurality of operating or working stations at which the ends of the leads are worked upon. For example, the insulation may be stripped from the ends of the leads at one station and terminals applied to the stripped ends at a subsequent station. The conveyer is provided with a plurality of associated wire clamps which are in alignment with each other in a direction transverse with respect to the path of movement of the conveyer. The wire loading station comprises a wire feeding means disposed on one side of the conveyer and having an extensible guide tube through which wire is fed by a pair of controlled wire feed rolls. When a pair of wire clamps arrive at the loading station, the extensible guide tube means is extended until its end is located adjacent to, but not past, the wire clamp on the opposite side of the conveyer from the wire feeding means. The projecting end of the wire is clamped in this clamp on the opposite side of the conveyer and the guide tube means is then retracted while wire is being fed therethrough to form a depending loop. After the required amount of wire has been fed, the end of the extensible guide tube will be located adjacent to the wire clamp on the same side of the conveyer as the wire feeding means, and this second clamp is then closed to grip the wire. The wire is then cut at a location between this second clamp and the end of the guide tube. The pair of clamps at the loading station is thus charged with an individual lead having its ends pointed in opposite directions and having its intermediate portion dangling or depending in the form of a loop between the clamps. In the case of very short leads, the intermediate portion will not dangle or depend from the underside of the conveyer but will extend axially and straight between the two wire clamps. The wire feeding means is, in the preferred embodiment, of a type known to the art which is capable of feeding very accurately any desired length of wire during a very short time and which is amenable to a numerical control or other controlling apparatus.

Figure 1:
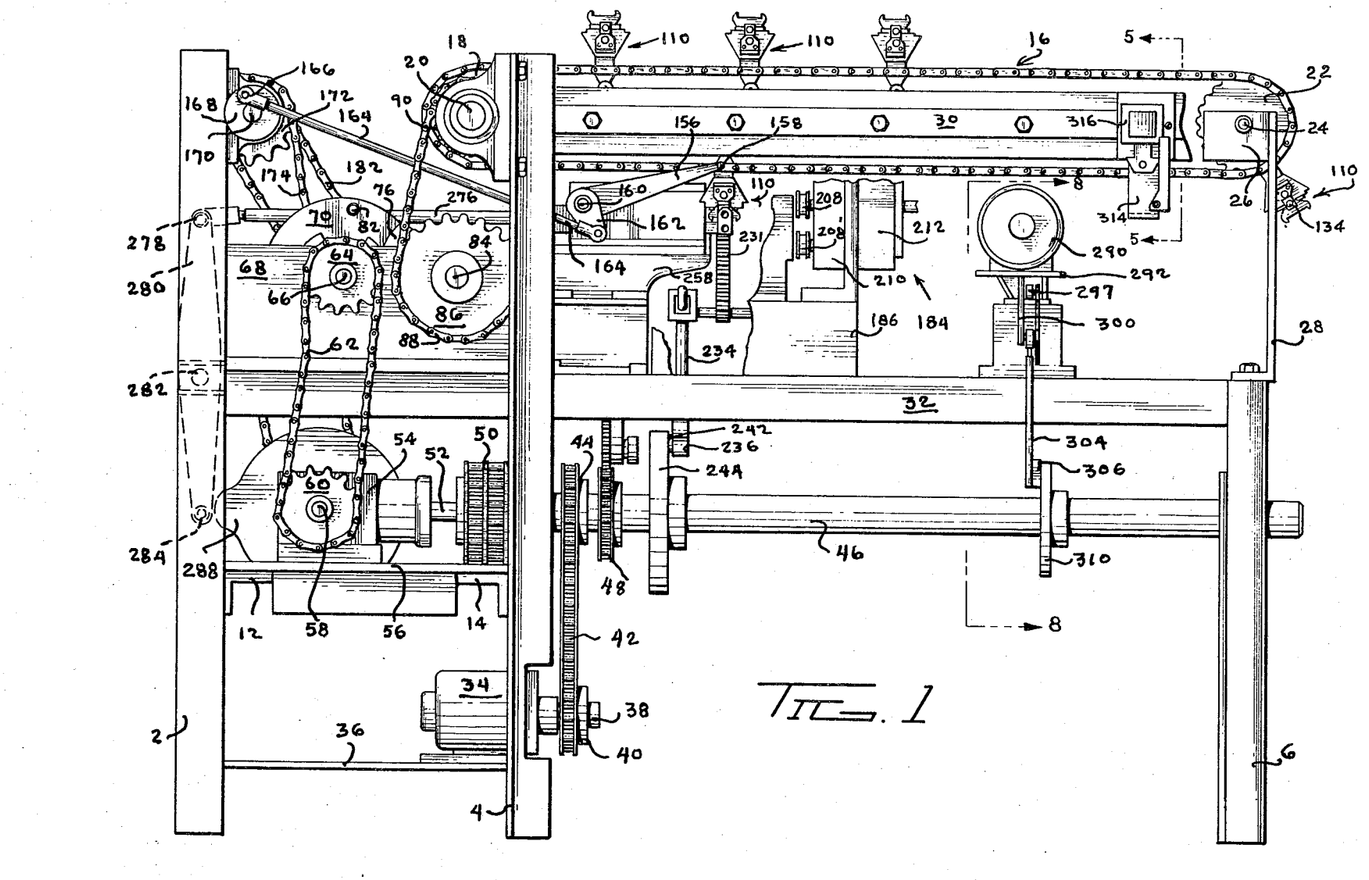
FIGURE 1 is a side view of a preferred form of apparatus in accordance with the invention.
Figure 2:
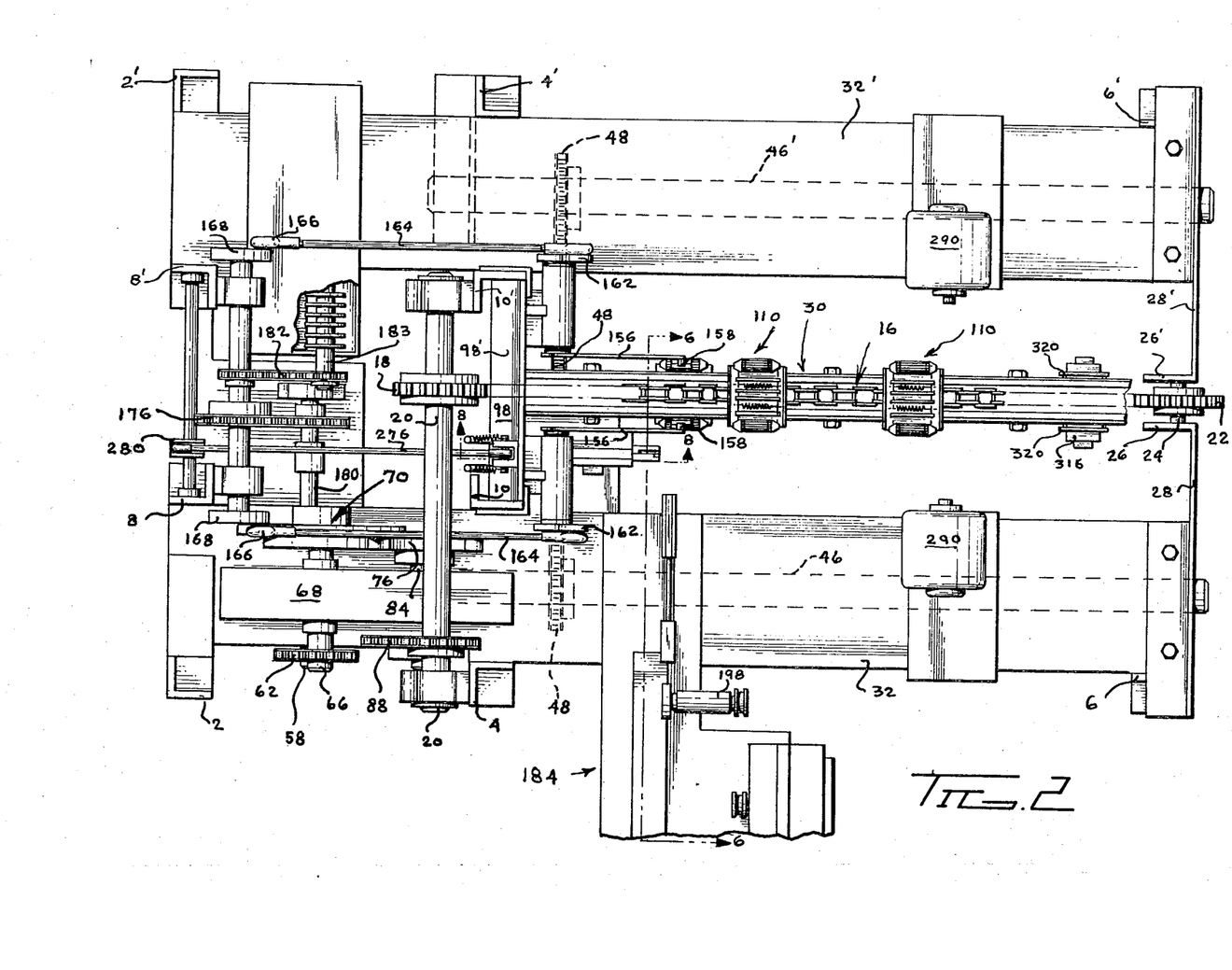
FIGURE 2 is a top plan view of the apparatus of FIGURE 1.

Referring first to FIGURES 1 and 2, the disclosed embodiment of the invention is supported on a frame comprising vertical supports 2, 2', 4, 4', 6, 6', 8, 8', and 10, 10'. Suitable transverse braces 12, 14 extend between the opposite sides of the frame as indicated. A conveyer chain generally indicated at 16 is disposed centrally between the sides of the frame structure and passes over a driven sprocket 18 on a shaft 20 which is supported in suitable pillow bearings mounted on the vertical supports 4 and 10'. Chain 16 also passes over a suitable idler sprocket 22 which is mounted on a shaft 24 extending between, and supported by, a pair of brackets 26, 26'. The brackets 26, 26', in turn, are secured to the ends of buttresses 28, 28' which are mounted on the support members 6, 6' and which extend upwardly and inwardly towards the medial plane of the machine. The span of chain 16 between the sprockets 18, 22 is supported by means of a support structure generally indicated at 30 which is described in greater detail below. Platforms 32, 32' extend on each side of the conveyer chain and are secured to the vertical support members. These platforms 32, 32' support the wire feeding mechanisms and the various other mechanisms such as the stripping mechanisms and crimping presses.

The conveyer chain 16 is periodically indexed by a drive mechanism comprising a motor 34 mounted on a support plate 36 and having an output shaft 38 which is coupled by means of sprockets 40, 44 and a chain 42 to a shaft 46 which extends beside the path of movement of the conveyer and beneath the support platform 32. A similar shaft 46' is provided beneath the platform 32', the shafts 46, 46' being coupled to each other by means of suitable sprockets on the two shafts and a drive chain 48.

The shaft 46 extends leftwardly in FIGURE 1 beyond the vertical support member 4 and is connected by means of a coupling 50 to one shaft 52 of a right angle drive mechanism 54 mounted on a support plate 56 extending between the vertical supports. The right angle drive 54 has an output shaft 58 on which there is provided a sprocket 60. A chain 62 extends over this sprocket 60 and over a sprocket 64 on a shaft 66 supported in a bearing block 58 which is mounted on the lefthand portion of the support platform 32. Shaft 66 extends through the bearing block 68 and is keyed or otherwise secured to the drive wheel 70 of a geneva mechanism or other suitable index drive shown in FIGURE 3. Drive wheel 70 has a circular boss 72 which is concentric with respect to the center of the shaft 66 and which has a segmental notch as shown at 74. A driven wheel 76 of the geneva mechanism has inwardly concave surface segments 78 which conform to the radius of the boss 72 and has radially inwardly directed slots 80 between adjacent concave surface portions 78. These slots 80 are adapted to receive an upstanding pin 82 on the drive wheel 70, the arrangement being such that each complete revolution of the drive wheel 70, the driven wheel 76, and the shaft 84 on which it is mounted are indexed through a 90° arc.

The shaft 84, which is also supported in the bearing block 68, has a sprocket 86 on its end which is coupled by means of a chain 88 to a sprocket 90 on the previously identified shaft 20. The intermittent rotary movement of the shaft 84 is thus transmitted to the shaft 20 causing periodic indexing of the conveyer chain 16. As will become apparent as the description proceeds, the amount of rotation imparted to the shaft 20 is sufficient to move the chain 16 a distance equal to the spacing between adjacent clamping mechanisms 110 which are mounted on the chain.

Figure 4:
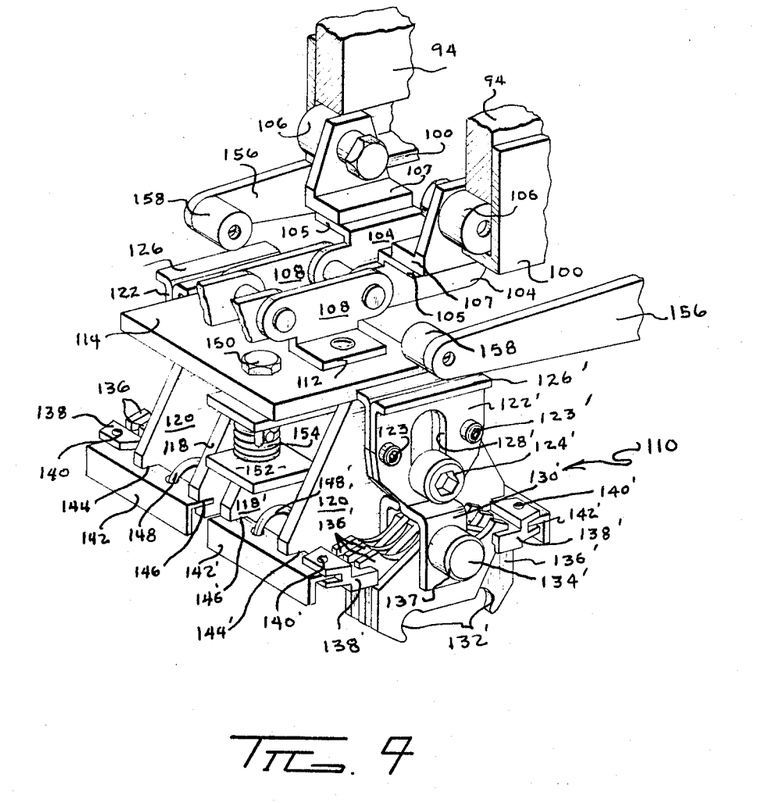
FIGURE 4 is a fragmentary perspective view showing one of the lead clamping mechanisms of the embodiment of FIGURE 1.
Figure 5:
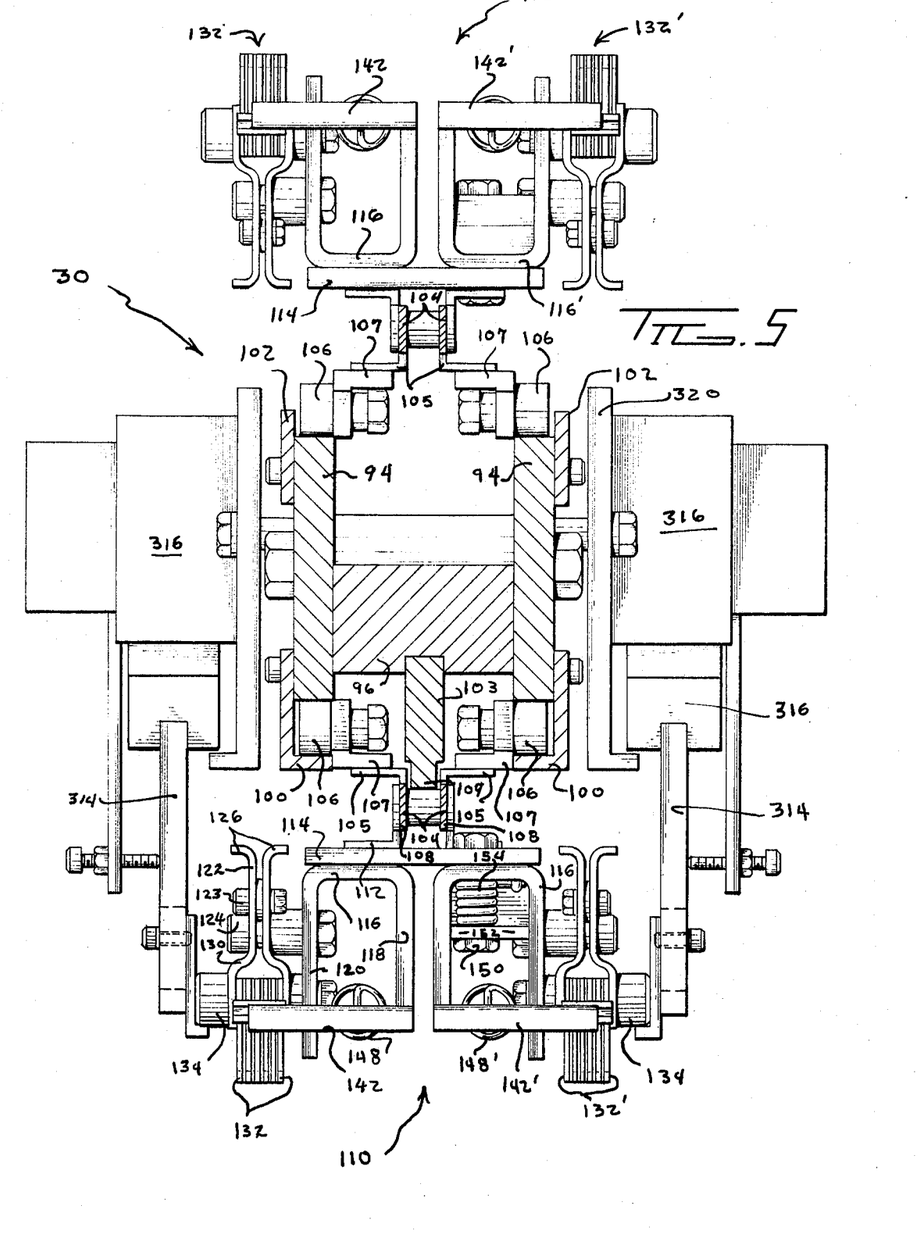
FIGURE 5 is a view taken along the lines 5—5 of FIGURE 1.

The conveyer chain is supported between the sprocket wheels 18 and 22 by means of a conveyer support structure 30 shown in detail in FIGURES 4 and 5. This supporting structure comprises a pair of elongated spaced-apart plates 94 which are secured to the sides of an elongated spacer block 96. The lefthand ends of the plates, as viewed in FIGURE 2, are secured to brackets 98, 98' which extend from the vertical support members 10, 10' of the frame. The right hand ends of the plates 94 are similarly supported on brackets secured to supporting buttresses 28, 28'. L-shaped plates 100 are secured to the lower margins of the plates 94 and have inwardly directed flanges which are spaced from the lower edges of the plates in order to define guideways for rollers 106 described below. Flat plates 102 are secured to the upper marginal portions of the plates 94 and define guideways on the upper side of the structure.

The individual lead clamping mechanisms 110 are suspended from the lower side of supporting structure 30 and supported on the upper side of this supporting structure by means of rollers 106, see FIGURE 5. These rollers are mounted on L-shaped brackets 107 which, in turn, are secured to flanges 105 of links 104 of the chain. The rollers on the portion of the chain which is beneath the chain support 30 are received in the guideways formed by the brackets 100 while the portion of the chain which is above the supporting structure 30 is supported by the upper edges of the plates 94, the retaining plates 102 functioning to guide the rollers on the upper side of the support. There is also provided a guide rib 103 on the underside of the spacer 96 which has a lower end 109 adapted to fit between the chain links and bear against the rollers of the chain. This guide rib limits the lateral movement of the clamping assemblies so that the ends of the leads held in the clamping assemblies will be precisely located when these ends are presented to the working stations.

The wire clamping mechanisms indicated generally at 110 are mounted on the undersides of plates 114 (FIGURE 4) which are secured by fasteners to flanges 112 to links 108 of the chain. Each plate 114 has two clamping mechanisms mounted thereon which are similar in most respects so that a description of one will suffice for both. The clamping mechanism which appears on the right in FIGURE 5 is pivotally mounted for purposes described below while the clamping mechanism on the left, which will be first described, is fixed to the plate 114. The same reference numerals, differentiated by prime marks, will be used to identify corresponding parts of the two clamping mechanisms.

The clamping mechanism on the left in FIGURE 5 comprises a U-shaped bracket 116 secured to plate 114 and having spaced-apart legs 118, 120. A slide member 122 is mounted in front of the outwardly facing surface of the leg 120 and comprises a pair of identical plates secured together by means of fasteners 123. The upper ends of these plates are flanged as shown at 126 to provide a surface which is engaged by the jaw closing mechanism. The lower ends of the plates of the slide member 122 are bent outwardly in opposite directions as shown at 130 and have a depending pair of spaced-apart portions which straddle a plurality of identical jaw elements 132. A guide pin 124 extends through an elongated vertical slot 128 in the slide member 122 and has its end fixedly mounted on the leg 120. A pivot pin 134 extends through aligned openings in the jaw sections 132 and into a vertical slot 135 in the leg 120. Pin 134 has a roller 137 on its end which is adapted to be engaged by a jaw closing mechanism described below.

The jaw members 132 have ends 136 which are slotted to receive fulcrum members 138. As shown best in FIGURE 4, alternate jaw members extend transversely past each other so that the six plates 132 make up a complete jaw structure. The lower ends of these jaw members are contoured to form a substantially circular gripping area when the jaws are closed. The fulcrum members 138 are pivotally connected at 140 to bars 142 which extend inwardly past the depending legs 118, 120. The inner sides of these bars extend into slots 144, 146, in the legs 118, 120, the slots 146 in the leg 118 providing a relatively snug fit for the bars while the slots 144 are somewhat oversized relative to the cross-section of the bars 142 to permit irregular pivoting member of these bars with respect to their inner ends. A spring 148 extends between the two bars 142, between the legs 118, 120, and pulls the forward ends of the bars 142 inwardly and towards each other.

Figures 3, 4A, 4B, 9:
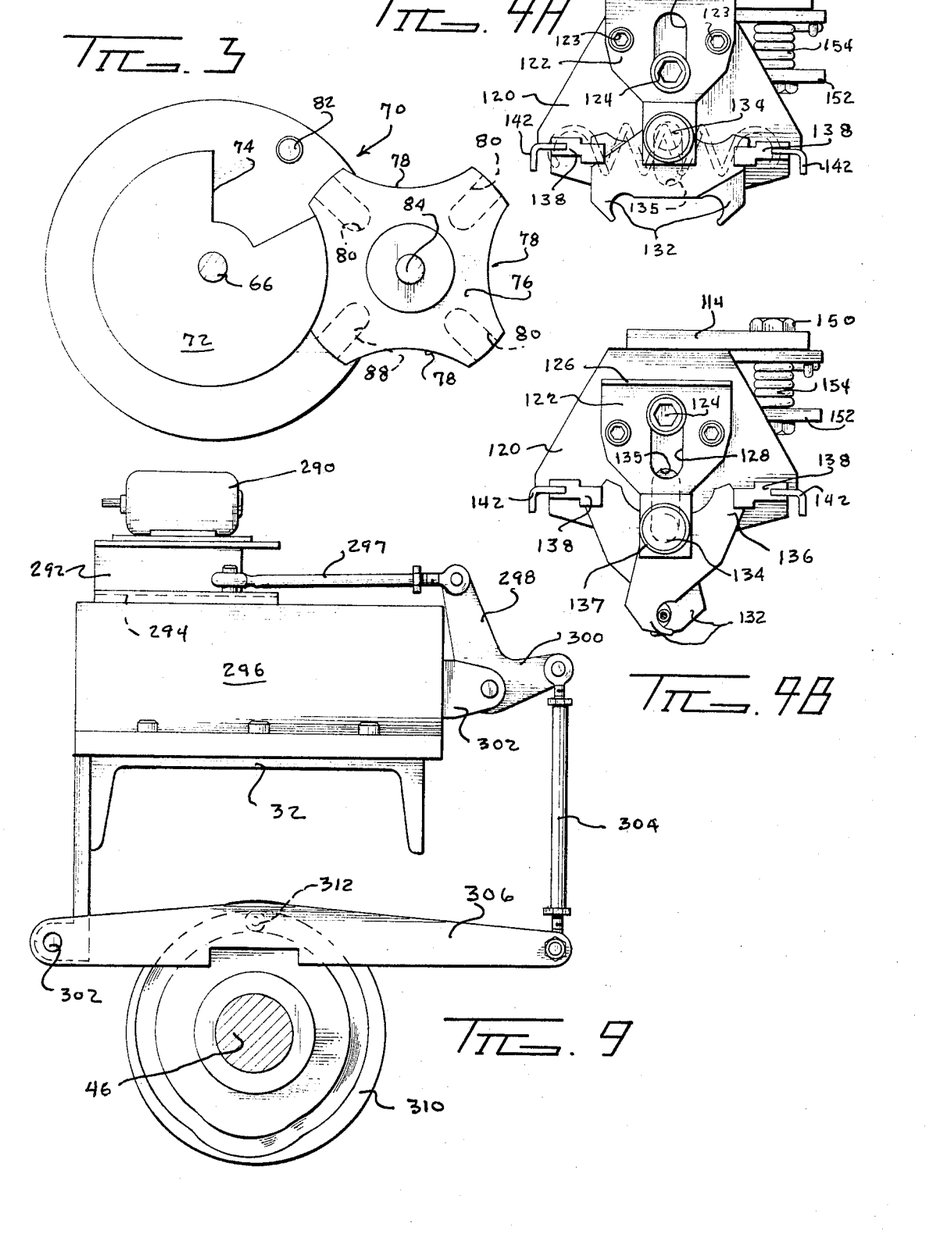
FIGURE 3 is a fragmentary view showing a geneva mechanism for indexing the conveyer chain.
FIGURES 4A and 4B are frontal views of one of the lead clamping mechanisms, FIGURE 4A showing the clamp in open condition and FIGURE 4B showing the clamp in its closed condition.
FIGURE 9 is a view taken along the lines 8—8 of FIGURE 1 showing one of the working stations.

As shown in FIGURES 4A and 4B, when the jaws are in their open condition, the slide member 122 is in its uppermost position with the guide pin 124 at the lower end of the slot 128 and with the pivot pin 134 at the upper end of the slot 135. When the parts are in the position of FIGURE 4A, the axis of the pin 134 is above the axis of spring 148 so that the spring functions to maintain the jaws in their open positions. The jaws are closed by merely pushing downwardly on the flagged upper ends of the slide member 122 thereby causing downward movement of the pin 134 and pivoting the jaw sections with respect to the fulcrum members 138. When the jaws are closed (FIGURE 4B), the axis of the spring 148 is above the axis of the pivot pin 134 so that this spring now maintains the jaws in their closed condition and in gripping engagement with the wire. As will be explained below, the jaws are opened by a mechanism which pulls the enlarged roller on the end of pin 134 upwardly.

Figures 13, 15:
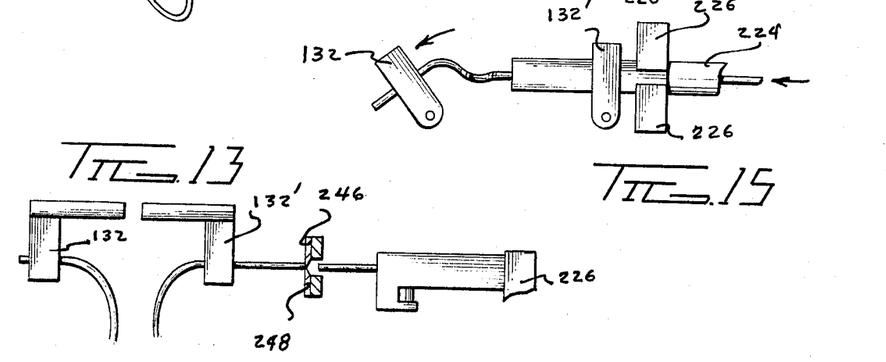
FIGURES 14 and 15 are semi-schematic plan views illustrating the operation of the wire or lead clamping mechanism and showing the manner in which this mechanism accommodates relatively stiff or heavy wires.
Figure 14:
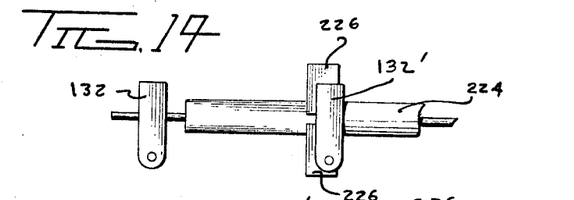

As previously noted, the jaw mechanism which appears on the right hand side of the plate 114 as viewed in FIGURE 4 (i.e. in the foreground) is pivotally mounted on the plate. The purpose of this pivotal mounting is to permit the apparatus to accommodate relatively stiff or heavy gauge wires having a high column strength. As shown also in FIGURE 5, the jaw mechanism which is on the right is secured to the plate 114 by means of a pin 150 which extends through the web 116, and into a plate 152 secured to, and extending between, the legs 118, 120. This pin constitutes a pivot axis permitting these right hand jaws to swing out of alignment with the jaws on the left of FIGURE 4 as schematically shown in FIGURES 14 and 15. A spring 154 surrounds the pin and is secured to the plate 152 to normally bias the jaw mechanism on the right to the position of FIGURE 5 in which these jaws are in alignment with the jaws on the lefthand side of the clamping mechanism. As shown in FIGURE 4, the vertically extending axis of pin 150 is located beside the horizontally extending center line of the jaws to permit the jaws on the right to swing out of alignment with the other jaws.

The jaws are closed by means of jaw closing mechanisms at the wire loading station, each pair of jaws being provided with its own closing mechanism since the two jaws are not closed at the same time. Referring to FIGURES 1, 2, and 4, at the time of closing the jaws, the slide plate 122 is pushed downwardly by a lateral extension 158 of an arm 156 which is located beside the supporting frame 30. The arm 156 (FIGURE 1) constitutes one arm of a bell crank pivotally mounted at 160 on a suitable bracket secured to the framework. The other arm 162 on the bell crank is pivotally connected to a leftwardly extending link 164 which has a pivotal connection at its opposite end 166 to a plate 168 which is keyed or otherwise secured to a shaft 170. The shaft 170 is supported between suitable pillow block bearings on the vertical supports 8, 8' and is connected by means of a sprocket 172 and chain 174 to a sprocket 176 on a shaft 180, see FIGURE 2. The shaft 180 extends from the previously identified right angle drive 54 and is rotated in synchronism with the shaft 58. In other words, the plate 168 makes a complete revolution during each operating cycle causing the bell crank arm 156 to move relatively downwardly in FIGURE 1 and close the pair of clamping jaws disposed at the loading station. It should be mentioned that the jaw closing mechanism for the pair of clamps which are on the far side (the upper side as viewed in FIGURE 2) of the conveyer from the wire loading mechanism are closed earlier than the jaws which are disposed adjacent to the wire loading mechanism. The reason for this difference in closing time will be apparent from the description presented below of the wire feeding and loading device.

The shaft 170 is also connected by means of a suitable chain 182 and sprockets to a timing cam shaft 183 having cams thereon which engage a bank of switches. These switches may be utilized to control the crimping presses, the wire insulation strippers, and other electrically actuated attachments on the apparatus.

Each clamping assembly 110 is loaded with an individual lead wire at the loading station generally shown at 184, FIGURES 2, 6, 7, and 7A. The wire feeding means and the wire loading means of this station are mounted on a support plate 186 which, in turn, is supported by a bracket assembly 188 on the platform 32. The wire is fed leftwardly as viewed in FIGURES 6 and 7 toward the conveyer by means of a pair of driven feed rolls 190, 192 mounted on a support plate 189. The feed rolls 190, 192 are keyed or otherwise secured to shafts 194, 196. As shown best in FIGURES 7 and 7A, the upper shaft 194 is rotatably supported in a bearing 198 on the end of one arm of a bell crank 200 which is pivoted to 201 to an upstanding bracket 202. The shaft 194 has a pulley on its end which is coupled by means of a timing belt 204 to a pulley on one output shaft 208 of a gear box 210. The shaft 196 of the lower feed roll 192 is supported in a similar bell crank arm 200' and has a pulley on its end which is couped to a second output shaft being immediatey beneath the output shaft 208. The shafts 208, 208' are driven at the same speed through the gear box 210 by means of a printed circuit motor 212 which is precisely controlled to load a lead of any desired length in the conveyer. The two rolls 190, 192 are biased toward each other by a spring 199 secured to the arms adjacent to their ends. The bell crank provided at 201, 201' have arms 203, 203' which extend towards each other and which pivotally couple to each other by means of a pin 205. This pin is mounted in the arm 203 and is received in an oversized slot in the arm 203'. By virtue of this arrangement, the two feed rolls are urged against the wire on opposite sides thereof.

The amount of wire fed by the feed rolls 190, 192 is metered by means of a pulse generator 214 having a shaft 216 on the end of which there is provided a metering roll 218. A pressure roll 220 is provided above the metering roll 218 to firmly press the wire against the periphery of the metering roll and prevent any slippage between the two, a conventional pressure applying structure as indicated at 221 being provided to achieve this effect. The pulse generator 214 is effective to generate a series of pulses which is responsive to the number of revolutions of the shaft 216 and, therefore, the metering roll 218.

The feed mechanism described above is controlled by a suitable controlling apparatus under the influence of a punched tape, punched card, magnetic tape, or similar intelligence source. During a given operating cycle, if, for example, a lead having a length of 12 feet is to be fed and loaded onto the clamping assembly at the loading station, the controller will start the printed circuit motor 212 to drive the feed rolls 190, 192. As the wire is fed, a series of pulses are generated by the pulse generator 214 and when the number of pulses thus generated reaches the number of pulses which are equivalent to a 12 foot lead, the controller is effective to stop the motor 212 thereby to discontinue the wire feeding operation.

The wire feeding mechanism described above is in many respects similar to the wire feeding device disclosed and claimed in the co-pending application of Glendon H. Schwalm, Ser. No. 523,656, filed Jan. 28, 1966. Circuitry for controlling wire feeding devices of this type is disclosed in detail in the co-pending application of Robert K. Grebe et al., Ser. No. 532,014, filed Jan. 5, 1966, now Patent No. 3,369,434. It will be understood, however, that the principles of the invention are not limited to this precise type of wire feeding mechanism and that other controllable wire feeding devices can be used. As will be pointed out below, however, an instantaneously controllable, or at least readily controllable wire feeding device, is desirable in order to permit the production of leads of varying lengths at an extremely high rate.

The wire fed by the rolls 192, 190 is guided through a leftwardly extending fixed guide tube 222 and through an extensible guide tube 224 which projects towards the plane of the conveyer and towards the wire clamping mechanism at the wire loading station. The extensible guide tube is mounted on the upper ends of supports 226 which, in turn, are slidably supported on the upper surface of the support plate 186 by means of guide rods 228. A rack bar 230 is mounted on the underside of the extensible guide tube 224 for engagement by the teeth of a sector gear 231 which is pivotally mounted at 232 on a suitable bracket on the underside of the plate 186. An arm 233 integral wtih the sector gear 231 is mounted on the pins 232 and is pivotally connected at link 234 which extends downwardly. This link 234, in turn, is pivoted to a lever 236 which is pivoted at its end 238 to a bracket secured to the platform 32. Lever 236 extends past a cam 244 on the cam shaft 46 and has a follower 242 mounted thereon which is received in a confined cam track in the cam 244.

Figure 6:
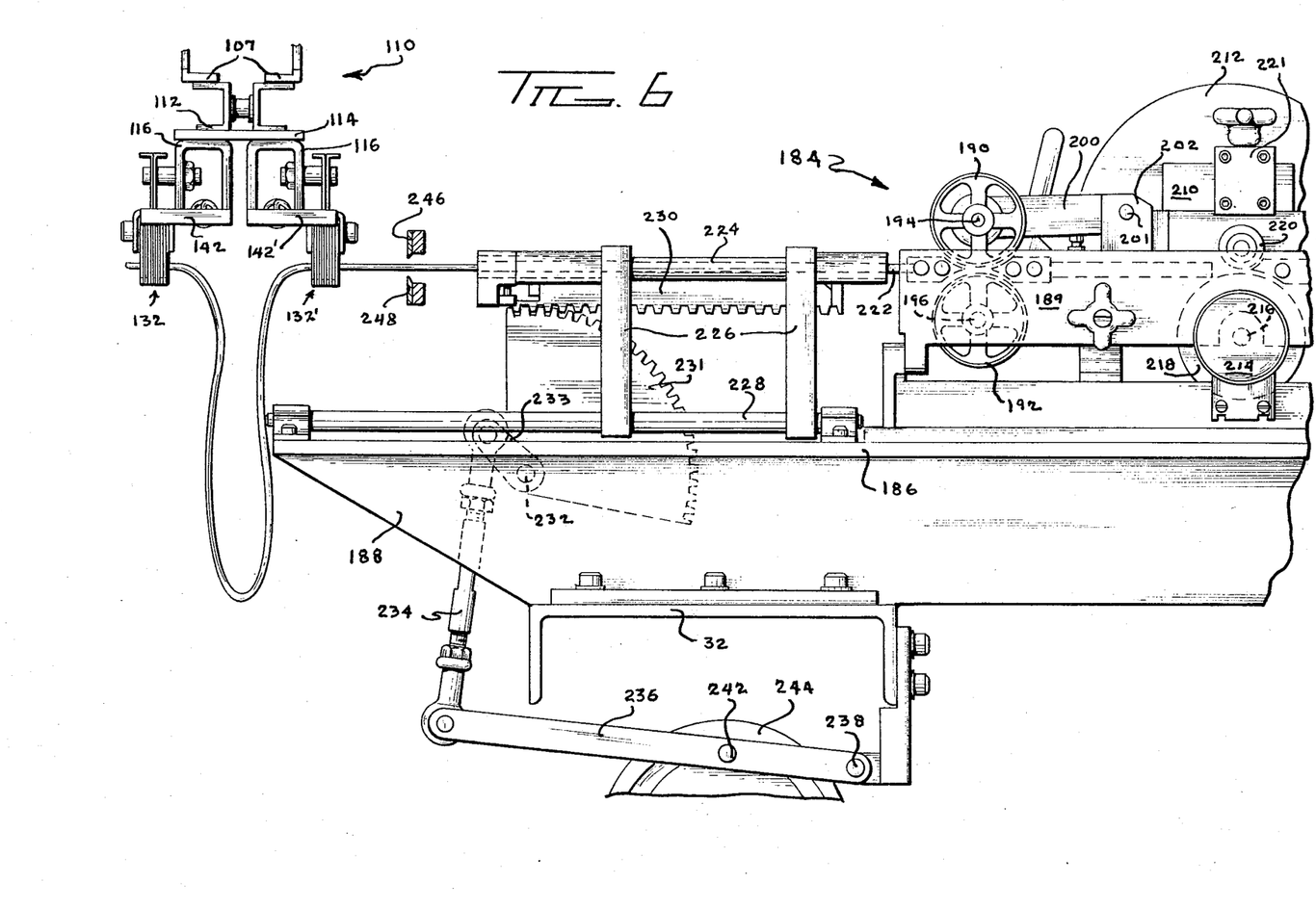
FIGURE 6 is a view taken along the lines 6—6 of FIGURE 2 and showing the wire loading station.
Figure 7:
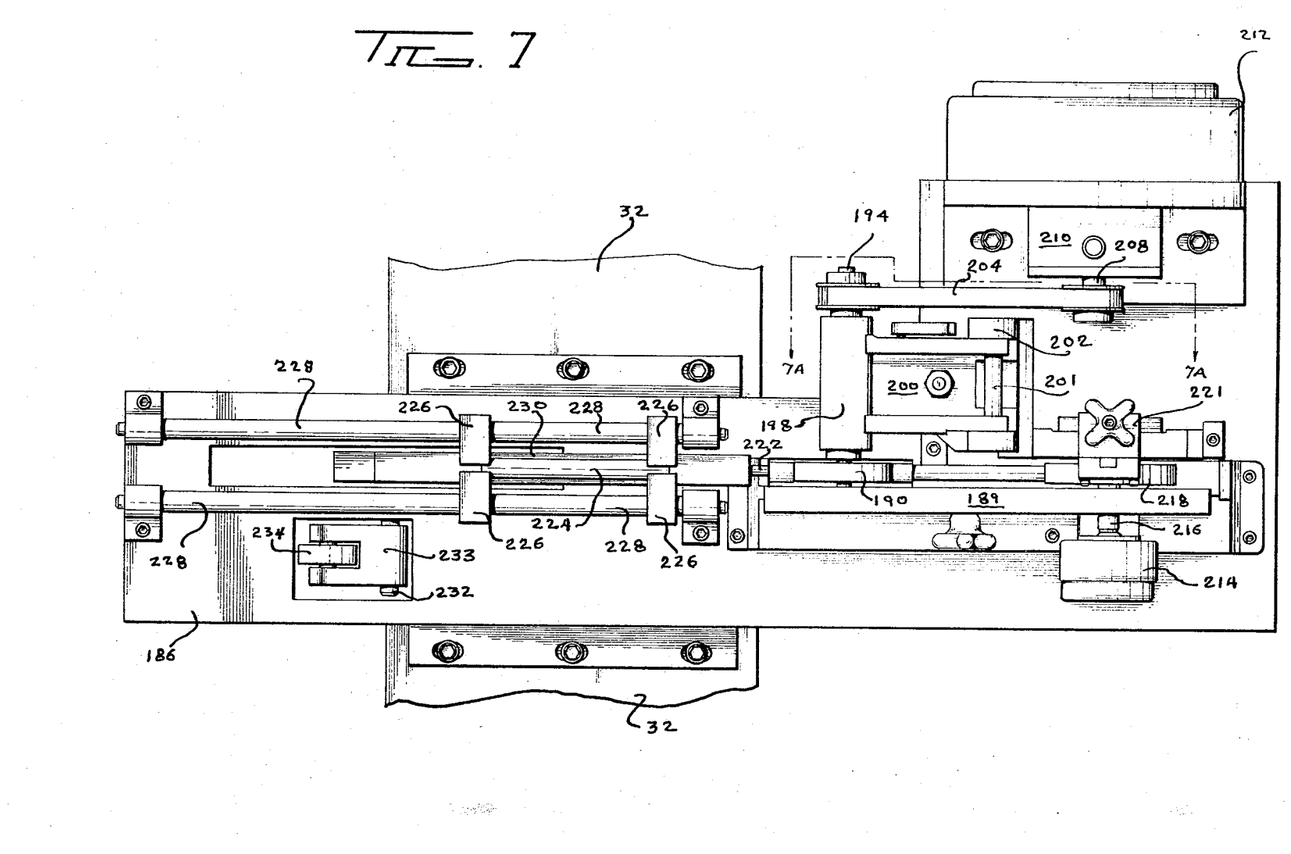
FIGURE 7 is a plan view of the wire feeding mechanism of FIGURE 6.
Figure 7A:
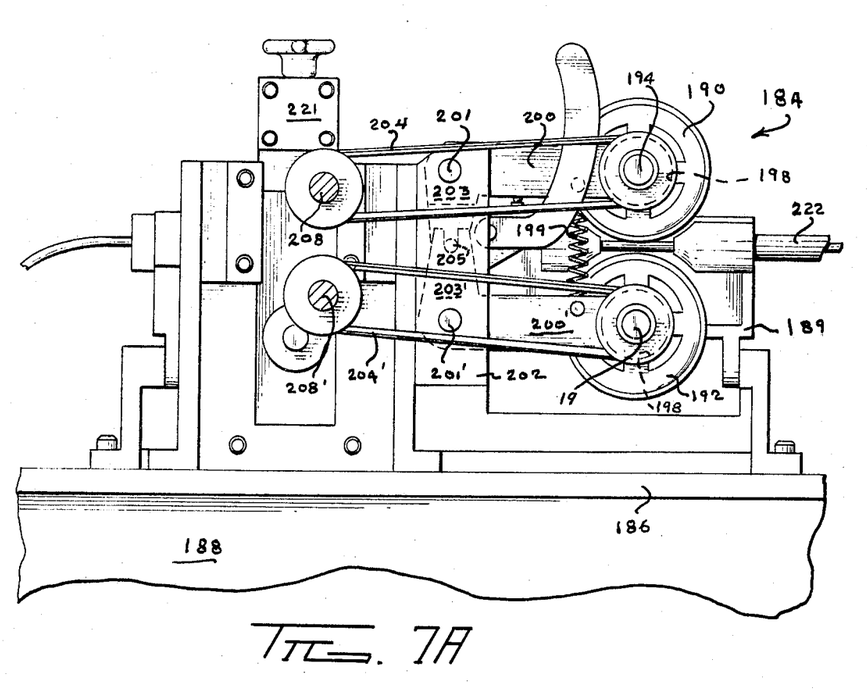
FIGURE 7A is a view taken along the lines 7A—7A of FIGURE 7.

The contour of the cam 244 is such that during each operating cycle and at the appropriate time, as will be explained below, the extensible guide tube 222 moves leftwardly until its end is disposed adjacent to the lefthand clamp. Thereafter, it moves back to its initial position and while it is undergoing this motion, the desired length of wire is fed through the guide tube to produce a finished lead which depends from the clamps to form a loop as shown in FIGURE 6.

After the lead wire has been fed to the pair of clamps of the clamping mechanism at the loading station, the end of the wire is cut at a location between the end of the extensible guide tube and the nearest clamp. The cutting mechanism comprises a pair of cutter blades 246, 248 (FIGURE 8) pivotally mounted at 250, 252 on parallel spaced-apart pivot pins. These pivot-pins are mounted in a slide member 254 which is mounted in a stationary guide member 256 supported by a bracket 258 above the platform 32. The lefthand ends of the cutter blades as viewed in FIGURE 8 have pivotal connections with links 260, 262 which are pivoted to a common pivot pin 264. Pin 264 is provided in the end of a rod 266 contained in the slide member 254. This rod extends through a bearing guide 268 toward the lefthand end of the slide member. Rod 266 is enlarged at its end as shown at 270 and has a pivotal connection 272 with a link 276. Rod 266 is normally biased leftwardly as viewed in FIGURE 8 by springs 274 which bear against the enlarged end 270 of the rod 266 and against the slide member 254.

The link 276 extends leftwardly as viewed in FIGURE 1 and is pivotally connected at its end 278 to a lever 280. The lever 280, in turn, is pivotally mounted intermediate its ends at 282 on a jack shaft extending between the vertical support member 8, 8' and has a cam follower 284 on its lower end which bears against a cam 288 on the previously identified shaft 58.

During each operating cycle and after an individual lead has been fed to the pair of clamps disposed at the loading station, the cam 288 causes the lever 280 to swing about its pivotal axes 282 thereby moving the slide member inwardly until the normally opened cutting blades 246, 248 are on each side of the wire. When the slide member 254 reaches the limit of its rightward movement as viewed in FIGURE 8, further rightward movement of the link 276 causes rightward movement of the control rod 266 with concomitant straightening of the toggle mechanism 260, 262 and closure of the cutting jaws 246, 248.

The individual leads which are fed to each pair of wire clamps at the wire loading station are moved along the path of movement of the conveyer and are presented successively to a number of working stations disposed to the right of the loading mechanism as viewed in FIGURE 1. In the disclosed embodiment, only one such station is shown and it will be understood that any number of stations can be provided. Referring to FIGURE 9, an applicator schematically indicated at 290 for applying a terminal to the end of the leads presented to this working station is mounted on a base 292 which, in turn, is slidably supported in guideways 294 on the upper side of the fixed support 296, this fixed support being supported on the upper surface of the platform 32. A link 297 is pivotally secured to the base 292 at one end and has its other end pivoted to one arm 298 of a bell crank 300. Bell crank 300 is pivoted to a bracket 302 extending from the fixed base 296 and has its other arm pivotally connected to a connecting rod 304 which extends downwardly towards, and is pivotally connected to, a lever 306. Lever 306 extends transversely across, and above, the main cam shaft 46 and is pivotally connected at 308 to a bracket depending from the platform 32. Intermediate its ends, lever 306 is provided with a cam follower 312 which is received in a cam track of a circular cam 310 on the main cam shaft.

Figure 8:
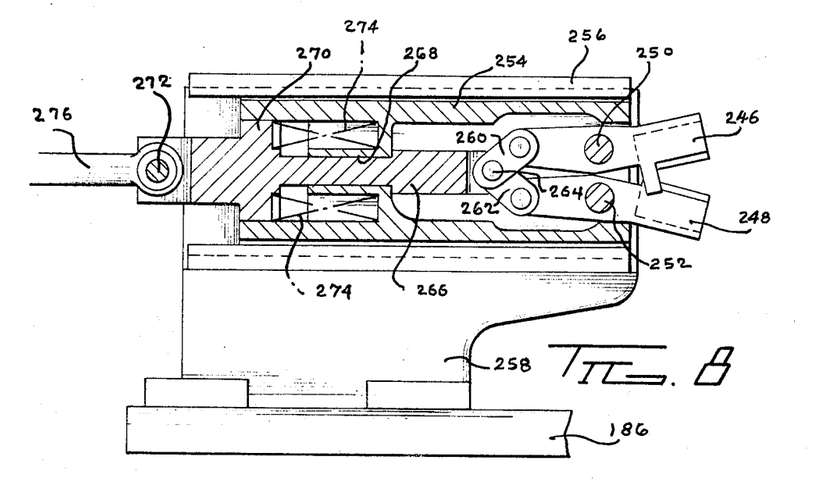
FIGURE 8 is a sectional side view taken along the lines 8—8 of FIGURE 2 showing the wire severing mechanism.

During each revolution of the main cam shaft, the slidable base 292 on which the applicator 290 is mounted is moved leftwardly as viewed in FIGURE 8 towards the conveyer. The wire held by the jaw which is then located at the same working station will be presented to the applicator 290 and a suitable terminal will be crimped onto the end of the wire.

As previously noted, a number of working stations can be provided on each side of the apparatus. For example, the first station downstream from the wire loading station might constitute an insulation stripping apparatus in which a stripping device mounted in the manner shown in FIGURE 9 is moved towards the wire and the insuation is stripped from the wire end. Susequently, the stripped ends of the leads are presented to crimping stations as shown in FIGURE 9.

The finished leads are released from the conveyer by a release mechanism shown in FIGURE 5 and comprising a depending arm 314 secured to the armature of a solenoid 316. The solenoid, in turn, is mounted on a plate 320 which is secured to one of the side plates of the supporting structure 30. The arm 314 has an L-shaped lower end which extends inwardly beyond the enlarged end of the pin 134. It will be apparent that upon energizing of the solenoid 316 with upward movement of the armature 316, the pin 134 will be pulled upwardly from the position shown in FIGURE 5, thereby opening the jaws.

Figure 10:
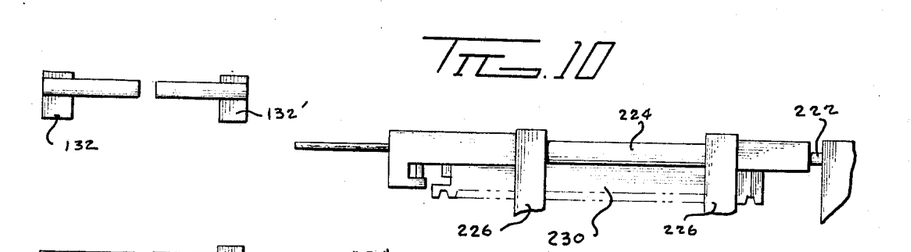
FIGURES 10–13 are semi-schematic side views illustrating the manner in which the individual leads are loaded on a lead clamping mechanism.

The operation of the disclosed embodiment is as follows assuming that the conveyer has been indexed and a clamping mechanism is disposed at the wire loading station with the two jaws of the clamping mechanism open and ready to receive wire as shown in FIGURE 10.

Figure 11:
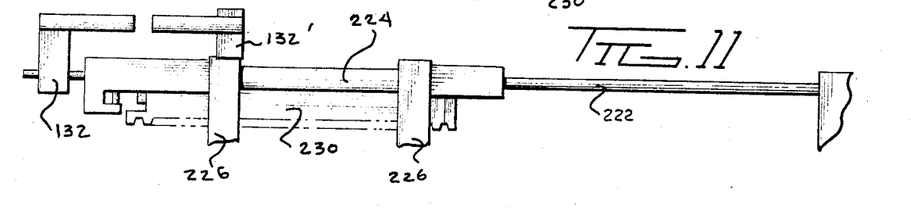
Figure 12:
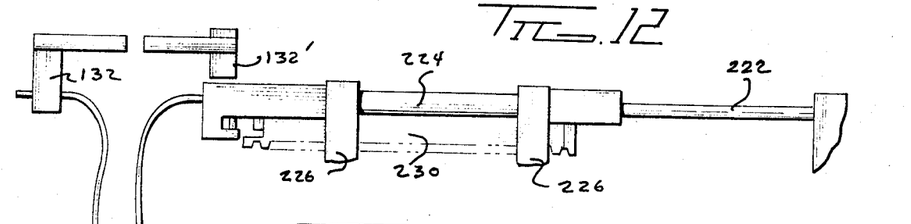

The extensible guide tube 222 is first moved leftwardly from the position of FIGURE 10 to the position of FIGURE 11 by the sector gear 231. At the limit of its leftward movement, the end of this extensible guide tube is adjacent to the lefthand clamp of the pair of clamps at the wire loading station. The lefthand clamp in FIGURE 11 is closed and the wire feeding mechanism is actuated to feed wire through the wire guide tube to form the dangling loop shown in FIGURE 12, the extensible guide tube being retracted during this interval to its initial position. As previously noted, this loop can be relatively long for long leads or will be non-existent if an extremely short lead is being loaded onto the conveyer. As noted above, the wire feeding mechanism can be controlled to produce a lead of any desired length. After the extensible guide tube returns to its initial position (FIGURE 13), the wire cutting mechanism moves rightwardly as viewed in FIGURE 2 until the blades are in each side of the wire and the blades are then closed to cut the wire between the end of the guide tube and the righthand clamp at the loading station. The conveyer is then indexed and the lead is presented to the successive working stations disposed along the path of movement of the conveyer.

During each cycle, the previously loaded leads will be presented to the working stations at which their insulation will be stripped and terminals will be crimped onto the stripped ends. Finally, during each operating cycle, a finished lead will be presented to the discharge station (FIGURE 5), and the solenoids will be energized to discharge a finished electrical lead.

One distinct advantage of the disclosed embodiment of the invention is that extremely short leads can be manufactured as well as extremely long leads. Short leads can be made by virtue of the fact that the clamps of each associated pair of clamps are relatively close to each other so that a wire held in the lefthand clamp in FIGURE 10 and extending into the right hand clamp would have a length no greater than the distance between the clamps of each pair. Extremely long leads can be made by virtue of the fact that the dangling loop shown in FIGURE 12 can be of any length. Furthermore, the lead length can be changed by merely adjusting the feeding mechanism to feed the desired length of wire while the extensible guide tube is moving between the positions of FIGURES 11 and 12.

As previously explained, the one wire clamp of each clamping mechanism is pivotally mounted on the plate 114 in the manner such that it can be swung out of alignment with the other wire clamp. FIGURES 14 and 15 illustrate the advantage of this arrangement which is important in those cases where the wire is of a relatively heavy gauge. FIGURE 14 shows the positions of the wire clamps immediately after the pivoted clamp has been closed into gripping engagement with the wire end and prior to the commencement of wire feeding. If the wire clamp on the left in FIGURE 14 was rigidly mounted rather than being pivoted and if the wire was of a relatively heavy gauge having a high column strength, it would resist feeding and would be stressed in compression after the manner of a compressively stressed column. In other words, the wire, by virtue of its high column strength would resist formation of the dangling loop during feeding. As a result, the feed wheels might slip relative to the wire or the wire might buckle and kink. When the clamp on the left is pivotally mounted, however, as in FIGURE 14, this clamp will swing about its pivotal axis as a result of its being pushed in a counterclockwise direction by the compressively stressed wire as shown in FIGURE 15. The pivotal movement of the clamp will provide added space for the wire to flex and the dangling loop will be formed. After completion of the wire feeding operation, the clamp on the left will swing back to its initial position under the influence of the spring 154.

While the invention has been described with particular reference to the manufacture of electrical leads, it will be understood that machines in accordance with the invention can be used in other circumstances where filamentary material is being cut and its ends are being worked on. For example, filamentary fibre optic material is currently being used for conveying light from a bulb to a plurality of observation points. The fibre optic material is thus handled in much the same manner as electrical leads and therefore must be cut to given lengths and the ends of the fibre optic material are often provided with terminations. It will be apparent then that the disclosed embodiment of the apparatus could be employed to manufacture fibre optic leads in the same manner as it is used to manufacture electrical leads.

Changes in construction will ocur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

What is claimed is:

1. Apparatus for feeding and cutting filamentary material into discrete lengths and presenting the ends of each length to a series of working stations, said apparatus comprising:

a narrow conveyer movable along a predetermined path, a loading station beside said path on one side thereof and a plurality of working stations on said one side and on the other side of said path, a plurality of pairs of closable material grippers on said conveyer, the grippers of each pair being in substantial alignment with each other, one gripper being on said one side and the other gripper being on said other side of said path, material loading means on said one side at said loading station comprising extensible material guide means and feeding means for feeding material through said guide means, said guide means being extensible from a normal position in which its end is disposed adjacent to said one gripper to an extended position in which its end is disposed adjacent to said other gripper, means for extending and retracting said guide means, means for closing said other gripper when said guide means is extended whereby the leading end of said material is gripped during retraction of said guide means, control means for said feeding means to feed material through said guide means during retraction of said guide means, means for closing said one gripper after retraction of said guide means whereby said material is gripped adjacent to said guide means, material cutting means between said one gripper and said guide means operable to cut said material after retraction of said guide means whereby a discrete length of said material is held by said grippers with the ends of said material pointing in opposite directions, and means for indexing said conveyer whereby said discrete lengths are presented to said working stations.

2. Apparatus as set forth in claim 1 wherein said other gripper is pivotally mounted on an axis extending transversely of said path and transversely of said guide means, resilient means normally maintaining said other gripper in alignment with said one gripper and permitting pivotal movement of said other gripper during feeding of relatively stiff material.

3. Apparatus as set forth in claim 1 wherein said material is wire, said working stations comprising applicators for applying terminals to the ends of wires.

4. Apparatus as set forth in claim 1 including control means for said feeding means, said control means being effective to control said feeding means to feed different lengths of material during successive cycles.

5. In a lead making machine or the like of the type comprising a conveyor having a plurality of pairs of cooperative lead gripping devices thereon at spaced intervals for gripping the ends of a lead, a loading station beside said conveyor on one side thereof and means for feeding wire to each pair of gripping devices, the improvement comprising: means pivotally mounting the one lead gripping device of each pair which is on the side of said conveyer remote from said means for feeding wire, whereby, during feeding of a relatively stiff wire while the leading end of said wire is held by said one lead gripping device, said one gripper will swing out of alignment with the other one of said grippers to permit flexing of said wire.

6. A device as set forth in claim 5 wherein said one gripping means is mounted on a pivotal axis extending transversely of the path of movement of said conveyor and transversely of the path of wire feed.

References Cited

UNITED STATES PATENTS

| | | | |
|---|---|---|---|
| 2,768,425 | 10/1956 | Andren. | |
| 3,184,950 | 5/1965 | Sitz | 72—419 X |
| 3,283,398 | 11/1966 | Andren | 29—203 X |
| 3,369,434 | 2/1968 | Schwalm | 83—17 |

THOMAS H. EAGER, Primary Examiner

U.S. Cl. X.R.

72—419